Feb. 20, 1934.  J. MIHALYI  1,947,482
PHOTOGRAPHIC FILM PACKAGE
Filed Feb. 6, 1933   2 Sheets-Sheet 1
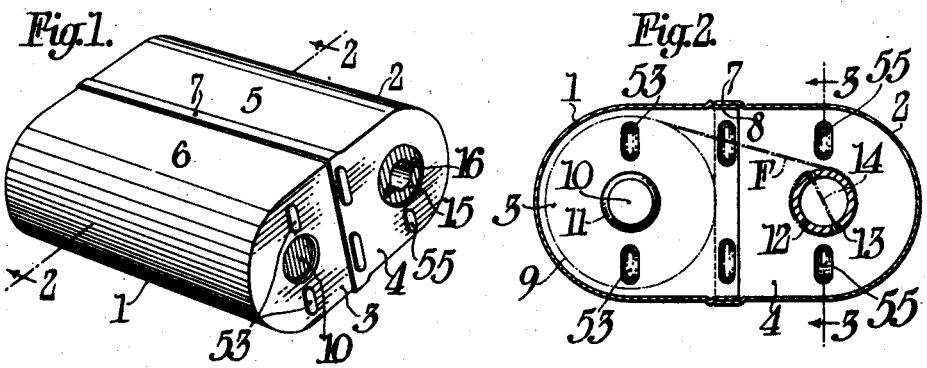
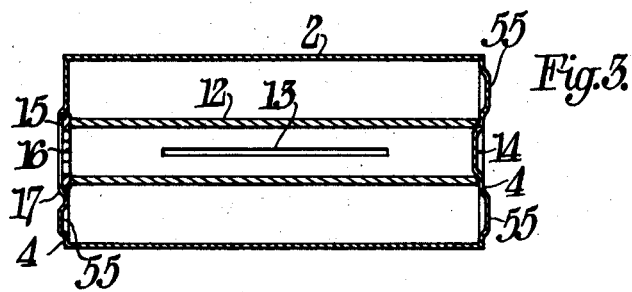
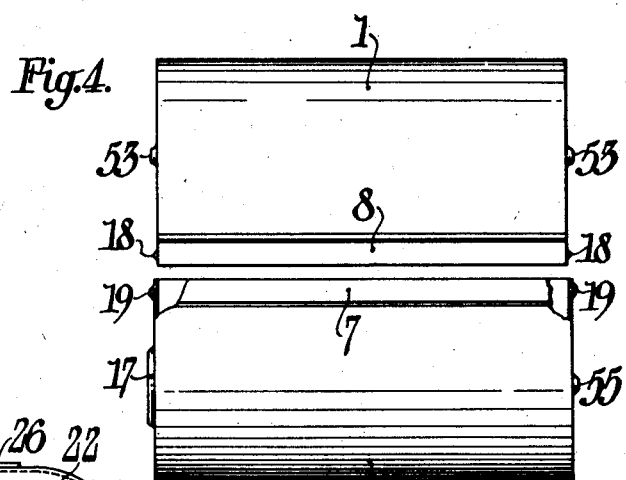
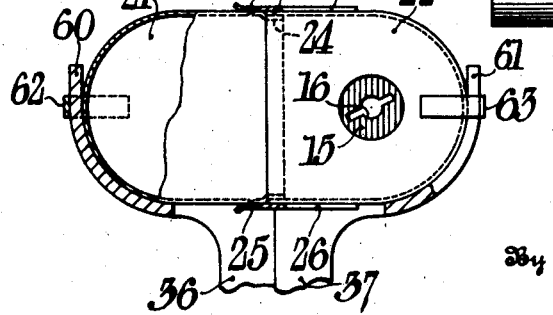
Inventor:
Joseph Mihalyi,
Newton M. Pernuss
Donald H. Stewart
By
Attorneys Feb. 20, 1934.   J. MIHALYI   1,947,482
PHOTOGRAPHIC FILM PACKAGE
Filed Feb. 6, 1933   2 Sheets-Sheet 2
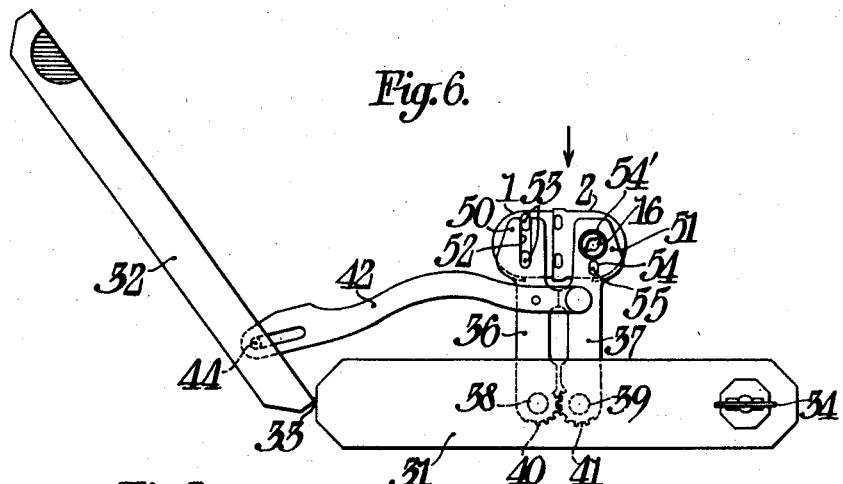
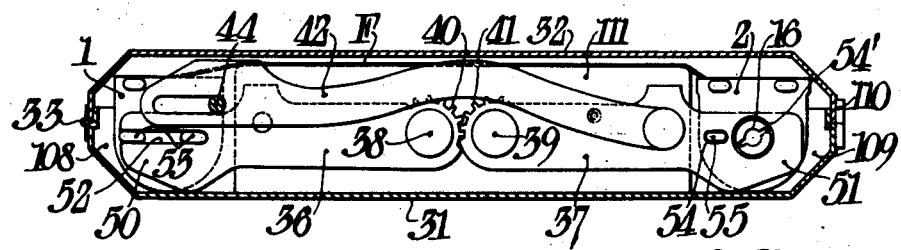
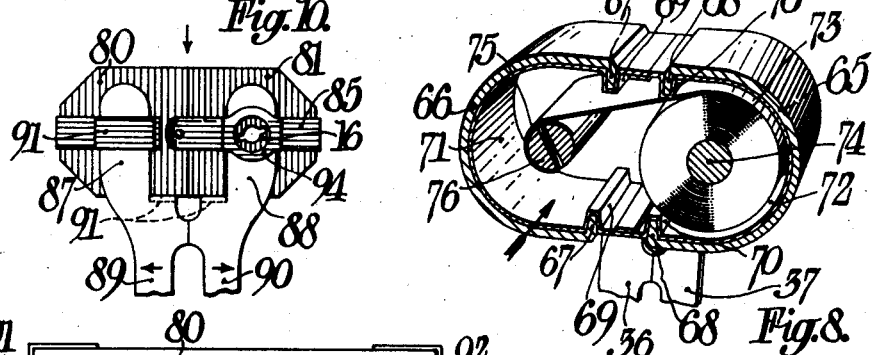
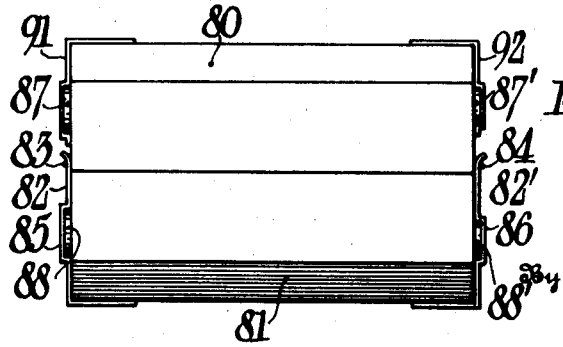

Patented Feb. 20, 1934

1,947,482

UNITED STATES PATENT OFFICE 1,947,482

PHOTOGRAPHIC FILM PACKAGE

Joseph Mihalyi, Rochester, N. Y., assignor to Eastman Kodak Company, Rochester, N. Y., a corporation of New York Application February 6, 1933. Serial No. 655,381

12 Claims. (Cl. 95—31)

This invention relates to photography, and more particularly to a package for roll film adapted to go into roll-holding cameras. One object of my invention is to provide a two-part film package, the parts of which, except when in a camera, may be held together and handled as a single unit. Another object of my invention is to provide a film package consisting of two parts, which are normally latched together, but which may be readily unlatched by suitable camera mechanism. Another object of my invention is to provide a film package in which the convolutions of film are rendered completely light-tight by the film package, and in which the danger of edge fog is entirely eliminated. Another object of my invention is to provide a film package in which the convolutions of film are definitely held against unwinding when the film is removed from a camera. Another object of my invention is to provide a two-part film package which may be loaded into a camera as a single unit, thus greatly facilitating the loading operation. Another object of my invention is to provide an inexpensive film package which will thoroughly protect the film against moisture and damage in shipment; and other objects will appear from the following specification, the novel features being particularly pointed out in the claims at the end thereof.

As is well known it is customary with roll-holding cameras to provide film on a single spool. This film, in order to pass through a camera for exposure, must be threaded onto an empty spool and wound through the camera from one spool to the other. During the operation of loading, a length of backing paper is drawn out while the unexposed film is held in a supply spool chamber, and while the end of the backing paper is being drawn across the exposure frame and threaded onto the take-up spool. During this operation the camera back is open and the convolutions of film may become loosened, so that light may enter between the flanges and backing paper, and thus fog the edges of the film. In removing a film spool from a camera it is difficult to hold the backing paper tight while the spool is being removed, and unless this is done, the film and backing paper may spring beyond the ends of the flanges of the spool, and thus become fogged. My invention is directed not only to overcome these usual difficulties, but is also directed to a film package which can be loaded into a camera with much less than the usual effort.

Coming now to the drawings, wherein like reference characters denote like parts throughout:

Figure 1 is a perspective view of a film package constructed in accordance with, and embodying a preferred form of my invention.

Figure 2 is an enlarged sectional view taken on line 2—2 of Figure 1.

Figure 3 is a sectional view taken on line 3—3 of Figure 2.

Figure 4 is a top plan view of the package shown in Figure 1, but with the parts slightly separated.

Figure 5 is a fragmentary view, part in elevation and part in section, showing another embodiment of my invention.

Figure 6 is a side elevation of the film package in Figure 1, after it has been loaded into a special type of camera adapted to use this film package.

Figure 7 is an enlarged sectional view showing the position of the two parts of the film package after the camera shown in the preceding figure has been closed, and after the film carried by the two-part film package has been stretched across the exposure frame.

Figure 8 is a fragmentary view partially in section, showing still another embodiment of my invention.

Figure 9 is a top-plan view of still another type of film package.

Figure 10 is a fragmentary end elevation of the magazine shown in Figure 9.

While it is evident from the drawings that my invention is susceptible of a number of different forms, it is to be understood that the drawings show only a few of the preferred embodiments of my invention.

My invention comprises broadly, a film package which may be handled as a single unit, and which comprises two separable parts normally held together.

Referring to Figure 1, my film package may consist of a pair of sections 1 and 2, each comprising end walls 3 and 4, these end walls being connected by means of curved walls 5 and 6, which are formed to connect the pairs of end walls, and to normally leave one side open. The edges of the open sides of the elements are provided with inter-engaging flanges 7 and 8, as best indicated in Figure 2. These inter-engaging flanges preferably make a light-tight connection, so that the sections 1 and 2 form a light-tight housing for a film F, which they are adapted to contain.

In this specification and in the claims where I refer to film, it is to be understood that this term is used in its generic sense, as applied to ordinary roll film, and to include not only the support which carries a light-sensitive emulsion and which may also carry an anti-halation or opaque backing, but it also applies to film and backing paper, or to film backing paper and carbon paper; all of these being equivalents well known in the art.

The film package contains a coil of film in one element, here shown as element 1. This coil of film 9 may be supported entirely upon its ends and by embossings 10 in the walls 3, which project into the inner convolution 11 in such a way that the film coil is rotatably supported in the case, and at the same time cannot readily pull out from its position except as the film convolutions are unwound.

The element 2 of the film package is preferably provided with a hub member 12, slotted at 13 in the usual manner, and having the end 14 of the film, tightly attached to the hub by passing through the slot and winding a convolution about the hub member 12.

This hub member 12, as best shown in Figure 3, is supported upon an embossing 14, in an end wall 4 of the element 2, and at the opposite end may be provided with a disc 15, which is provided with winding key slot 16, as is customary with film spools and as is shown in Figure 1.

The disc 15 may lie in a recess area 17, of a wall 4, and may make a substantially light-tight joint therewith. As is obvious the film may be wound from element 1 to element 2 by turning hub 12.

During the time that the film package is removed from the camera, and during the loading and unloading operations, the film package is held together as a unit. This may be accomplished in various ways, and some of the embodiments of my invention will now be described.

It is preferable to hold the units 1 and 2 together by means of a snap-latch, and in Figures 1, 2 and 4, this snap-latch is shown to consist of formings 18 and 19 on the inter-engaging flanges 7 and 8 of elements 1 and 2. These formings are adapted to snap into engagement when sections 1 and 2 are brought together with the flanges 7 and 8 in overlapping relation, and may also be pulled apart when the sections 1 and 2 are drawn from each other.

In Figure 5 another type of snap-latch is illustrated. In this figure the sections 21 and 22 of the film package are provided with inner-engaging flanges 23 and 24. These flanges extend around the entire connection between the two elements. There are embossings 25 on element 21, and element 23 is provided with a pair of spring latch members 26, to engage these embossings.

It should be noticed that the embossings have tapered side walls, the angle of which is such that the snap-latches can readily snap over these embossings and can be readily pulled from the embossings without the necessity of manually raising the snap-latches. This is important for reasons which will be more fully described hereinafter.

I contemplate using the film packages constructed in accordance with my invention in a special type of camera which is made the subject matter of another application Serial No. 655,382 filed February 6, 1933 and as shown and described in this co-pending application the camera may consist of the structure shown in Figures 6 and 7.

As shown in these figures, the camera may consist of a body portion 31, to which a back 32 is hinged at 33. The back 32 is adapted to telescope a portion of the camera body. The camera body may carry the usual type of film winding key 34, which may be moved to and from a position in which it lies in the film chamber in any well known manner.

In order to load my film package as a unit into such a camera, the camera is equipped with a pair of hinged arms 36 and 37 pivotally mounted at 38 and 39 upon the camera body, and having gear teeth 40 and 41 which mesh and which cause the arms 36 and 37 to move together. One arm 37 may be pivotally attached to link 42 and this link may have a pin and slot connection with the back 32 upon a stud 44 on the cover. Thus when the cover is moved to the position shown, the arms 36 and 37 are brought into the loading position shown in Figure 6, and when the cover 32 is swung to the position shown in Figure 7, the arms 36 and 37 automatically separate the two elements of the film package, and move them down into the film chambers 108 and 109 of the camera, drawing the film across the exposure frame 111. A latch 110 of the camera holds the back in a closed position. After the camera has been closed as indicated in Figure 4, the winding key 34 is moved inwardly, so that a flange engages the winding key slot 16. The film is then wound across the exposure aperture in the usual manner until it is completely wound upon the hub 12 in the element 2. In order to remove the exposed film the camera cover 32 is again swung to the position shown in Figure 6, in which elements 1 and 2 are brought into engagement, and in which position the snap latches 18 and 19 will become engaged to hold the film package so that it may be removed as a unit.

Thus it will be seen that the film is not only adequately protected against light during the loading and unloading operations, but it is also completely contained in a light-tight package, and may be handled in both the loading and unloading operations as a single unit.

The film package must be provided with a means for engaging the film-holding devices designated in Figures 6 and 7 as 50 and 51. The holding device 50 may be provided with slots 52 adapted to receive flanges 53 of the element 1; and a holding device 51 may be provided with an aperture 54' through which the winding key may pass to the key slot 16, and with a slot 54 adapted to receive the lug 55 on element 2.

Thus it is evident that as the film package is moved downwardly in the direction shown by the arrow into the film holding device, the lugs 53 and 55 will engage their respective slots, which in effect form a slideway, guiding the film package into the film holders.

The chief function, however, of the cooperative lugs and slots just described, is that it enables the film holders to definitely grip the elements 1 and 2 with sufficient force to separate these elements when the camera is being closed and opened.

The type lugs and connections which may be employed to hold in position the film package in the film holders is not material, and a few of the preferred types will now be described.

Referring to Figure 5, the arms 36 and 37 may be provided with extensions 60 and 61 adapted to slide beneath straps 62 and 63, carried by the elements 21 and 22. This form is an extremely useful one, since by making extension 60 of different width from extension 61, and by making the straps 62 and 63 of different width, not only will these cooperating parts guide the film package into the film holders properly, but they will require that the film package is placed in the film holders in the right direction. In other words the film package shown in Figure 5 cannot be placed in, reversed from right to left.

It is possible to provide a film package which is slid in from the end of the film holders instead of moved in downwardly from the top of the spool holders as was described in referring to Figures 6 and 7 of the drawings.

Thus as shown in Figure 8, the spool holders may comprise cup-shaped members 65 and 66, having pairs of flanges 67 and 68 adapted to engage the formed over grooves 69 and 70 in the package sections 71 and 72. This film package may be slid into the film holders with the flanges and grooves forming cooperating rails.

In the form of film package shown in Figure 8 the sections are semi-cylindrical, and the film convolutions 73 are wound upon a hub 74, the end 75 of the film being attached to hub 76.

In Figures 9 and 10, I show an embodiment of my invention which is somewhat like Figure 5, in so far as the connections between the package elements and the film holders is concerned. This film package is shown as consisting of two elements 80 and 81, which taken together are hexagonal in close section. This shape being suitable for some of the film chambers of cameras now on the market.

The sections 80 and 81 may be held together by means of the snap-latches consisting of perforated straps 82 and 82', carried by element 81 being adapted to snap over formings 83 and 84 on element 80. These snap-latches may be conveniently formed from the ends of straps 85 and 86 which have portions spaced from the walls of element 81 to receive upwardly projecting arms 87 and 88 of the film holding device.

As indicated in Figure 10, 87 and 88 are continuations of the arms 89 and 90, each of which has formed over lugs 91, limiting the downwardly movement of the film package after it is loaded with the arms lying beneath the straps.

Element 80 also is provided with straps 91 and 92 which form openings for the upwardly extending arms 87 and 88'.

It should be noticed that the arms 87 and 88 on one side are much wider than the arms 87' and 88' on the other side. This is for two reasons: First to definitely locate the film package in the film holding; and secondly to provide room in one strap 85 for an aperture 94 which will give access to the winding key slot 16.

The connections between the film package and the film holding devices in Figures 9 and 10, both locate the film package with respect to the film holding devices, and in addition provide a very firm connection between the film holding devices and the elements of the package, so that when the film holding devices are swung in the directions shown by the arrows in Figure 10, the film package elements are definitely unlatched, and when the film holding devices are moved in an opposite direction, the sections are definitely latched.

It will be noted from the description of the various figures that with these embodiments of my invention, convolutions of film are adequately protected against light by the film package. The ends of the film convolutions lie adjacent to the ends of the two elements of the film package and consequently light cannot enter at this point. Moreover, the connection between the ends of the film convolutions and the ends of the package element need not be as light-tight as is necessary between film spool flanges and film, because the elements of the package prevent light from entering during the entire loading and unloading operations. A second feature which protects the film from light fog is that the convolutions of film closely approach the curved walls of the package elements when completely wound in either element, and thus cannot spring outwardly as is the case with film spools, so that light can leak between the various convolutions.

Not only is the film adequately protected against light leak, but the package is very much handier to use since the film package may be loaded as a unit into a camera designed for its reception.

While I have described and illustrated some of the preferred embodiments of my invention, it is obvious that a variety of different types may be readily designed, and I contemplate as within the scope of my invention all such forms as may come within the scope of the appended claims.

Having thus described my invention what I claim as new and desire to secure by Letters Patent is:

1. In a film package, two elements, one element carrying a plurality of convolutions of film, means carried by the element for protecting the ends of said convolution against light, a hub member carried by the other element to which the end of the said film is attached, means included in said element at the ends of said hub for protecting film against light, means for normally holding said elements together in a fixed relation whereby they may be loaded into a camera as a unit, said holding means also being releasable for threading through a camera.

2. In a film package, two elements, one element carrying a plurality of convolutions of film, means carried by the element for protecting the ends of said convolution against light, a hub member carried by the other element to which the end of the said film is attached, means included in said element at the ends of said hub for protecting film against light, means for frictionally holding said elements together so that they may be loaded as a unit into a camera, said frictional holding means being releasable.

3. In a film package for roll holding cameras the combination with a pair of complementary casings adapted to fit together and to be loaded as a unit into a camera, of a plurality of convolutions of film positioned in one of said casings, means in said casing preventing said film convolutions from coming out of said casing and permitting said convolutions to turn therein, a hub rotatably mounted in the other of said casings, one end of the said film coiled in the first mentioned casing being attached thereto, and means tending to hold the two casings together.

4. In a film package the combination with a pair of similar casings each having two end walls and a curved wall connecting the end walls and leaving one side open, a coil of film in one casing having its edges in light tight engagement with the end walls thereof, and a hub in the other casing, the end of the film being attached to said hub.

5. In a film package the combination with a pair of similar casings each having two end walls and a curved wall connecting the end walls and leaving one side open, a coil of film in one casing having its edges in light tight engagement with the end walls thereof, and a hub in the other casing, the end of the film being attached to said hub, and means for normally holding the two casings together.

6. In a film package the combination with a pair of similar casings each having two end walls and a curved wall connecting the end walls and leaving one side open, a coil of film in one casing having its edges in light tight engagement with the end walls thereof, and a hub in the other casing, the end of the film being attached to said hub, and means for normally holding the two casings together, and said means including cooperating formings on the casing sections.

7. In a film package the combination with a pair of similar casings each having two end walls and a curved wall connecting the end walls and leaving one side open, a coil of film in one casing having its edges in light tight engagement with the end walls thereof, and a hub in the other casing, the end of the film being attached to said hub, and means for normally holding the two casings together, said means including a snap latch comprising frictionally engaging members on the two casings.

8. In a film package, the combination with two, separable elements of complementary shape each having ends and a curved wall between the ends with an open side, of overlapping flanges extending around the open sides, formings in the flanges of the two elements adapted to contact and form a snap latch between the two parts for holding them together, a film convolution revolubly carried by one element, an end of said film convolution being attached to a shaft revolubly carried by the other element, the curved wall of an element closely fitting an outer convolution of film when completely wound in said element whereby said convolutions may be held against accidental unwinding.

9. In a film package, the combination with two, separable elements of complementary shape each having ends and a curved wall between the ends with an open side, of overlapping flanges extending around the open sides, formings in the flanges of the two elements adapted to contact and form a snap latch between the two parts for holding them together, a film convolution revolubly carried by one element, an end of said film convolution being attached to a shaft revolubly carried by the other element, the curved wall of an element closely fitting an outer convolution of film, and the end walls of an element closely fitting the ends of said convolution when positioned in an element whereby said film convolutions may be rendered light tight at the ends and may be held against accidental unwinding.

10. A film magazine comprising two separable complementary halves, together constituting a light tight container, a roll of film rotatably supported in one half, a core carried in the other half and having the end of the roll of film attached thereto, a positive latch connection between the two halves and means on each half adapted to engage positively a complementary holding means in a camera whereby the halves may be engaged and moved apart to uncoil and stretch the film between them.

11. A film magazine comprising two separable complementary halves, each comprising an open sided trough like member with closed ends, and together constituting a light tight container, the open sides having at their edges complementary positive latch connections, a roll of sensitive film rotatably carried in one half and fitting snugly therein at its ends to reduce edge fog, a core rotatably mounted in the other half, the end of the film being secured to the core, and means on each half adapted to engage positively complementary holding means in a camera whereby the halves may be engaged and moved apart to uncoil and stretch a film between them.

12. A film magazine comprising two separable complementary halves, each comprising an open sided trough like member with closed ends, and together constituting a light tight container, the open sides having at their edges complementary positive latch connections, a roll of sensitive film rotatably carried in one half and fitting snugly therein at its ends to reduce edge fog, a core rotatably mounted in the other half, the end of the film being secured to the core, and means on each half adapted to engage positively complementary holding means in a camera whereby the halves may be engaged and moved apart to uncoil and stretch a film between them, the core having means whereby it may be turned to wind the film upon it, the dimensions of the second half being such that the film wound on the core will fit snugly within it.

JOSEPH MIHALYI.